Patented May 19, 1942

2,283,336

UNITED STATES PATENT OFFICE 2,283,336

VULCANIZATION OF RUBBER

Arthur M. Neal, Wilmington, Del., and Bernard M. Sturgis, Pitman, N. J., assignors to E. I. du Pont de Nemours & Company, Wilmington, Del., a corporation of Delaware No Drawing. Application July 25, 1940, Serial No. 347,474

23 Claims. (Cl. 260—786)

This invention relates to the vulcanization of rubber and more particularly to new combinations of accelerators for the vulcanization of rubber.

It has been proposed to accelerate the vulcanization of rubber with a combination of accelerators of which one is designated the primary accelerator and the other is designated a secondary accelerator. The purpose of the secondary accelerator is generally to activate the primary accelerator. The use of secondary accelerators, as activators for acidic type primary accelerators such as the mercapto-thiazoles, has presented particularly difficult problems due to the tendency of such combinations to prevulcanize or "scorch" the rubber during processing operations. This is particularly true when it is attempted to use a dithiocarbamate as the secondary accelerator. In general, it has been found impossible to use a dithiocarbamate accelerator as a secondary accelerator with an acidic primary accelerator, such as the mercapto-thiazoles and particularly 2-mercapto-benzothiazole, because of the great activity of such combinations of accelerators. Generally, such combinations of dithiocarbamates and mercapto-thiazoles render the rubber incapable of being processed, due to its tendency to prevulcanize or scorch. Furthermore, combinations of dithiocarbamates with mercapto-thiazoles and other similar acidic accelerators have been found to impart inferior physical properties to the rubber. The resulting vulcanizates are generally poor in resistance to abrasion and in resistance to aging. Further, such combinations of accelerators usually cause bad reversion of the rubber at the longer cures, which is accompanied by a loss in tensile strength and a deterioration of the physical properties in general.

It is an object of the present invention to provide an improved method of vulcanizing rubber. Another object is to provide vulcanized rubber of improved properties. A further object is to improve the vulcanization of rubber by employing, as accelerators therein, new combinations of accelerators which are sufficiently safe at processing temperatures for commercial utilization and which are at the same time very active at normal vulcanization temperatures. A still further object is to provide a new combination of accelerators for the vulcanization of rubber which produces vulcanized rubber of improved properties. Other objects are to provide new compositions of matter and to advance the art. Still other objects will appear hereinafter.

The above and other objects may be accomplished in accordance with our invention, which comprises employing, as accelerators for the vulcanization of rubber, a 2-mercapto-thiazoline accelerator, as a primary accelerator, and an accelerating metal salt of a dithiocarbamic acid, as a secondary accelerator. We have found that, when such accelerators are employed together for accelerating the vulcanization of rubber, novel results are obtained, which are different than would be expected from the results which have been obtained when it has been attempted to employ dithiocarbamates with mercapto-thiazoles, such as 2-mercapto-benzothiazole, and similar acidic type accelerators. We have found that the 2-mercapto-thiazoline accelerators can be activated with metal salts of dithiocarbamic acids so that stocks will be obtained, which can be processed safely even though such metal salts are noted as being amongst the most active accelerators known, but which will give very fast cures with flat curing curves at the usual vulcanizing temperatures, producing vulcanizates possessing exceptionally good moduli and tensile properties. They do not have any marked tendency to prevulcanize or scorch. In general, the curing curves show a remarkable plateau effect and the vulcanizates show no reversion, the physical properties standing up well on the longer cures. Moreover, rubber, vulcanized by the joint employment of the accelerators of our invention, possesses remarkable resistance to deterioration by heat or oxidation. In particular, it is resistant to that deterioration, normally caused by exposure to high temperatures. Vulcanized rubber compounds, prepared in accordance with our invention, also possess excellent resistance to abrasion, excellent resistance to flex-cracking and excellent resistance to tear, both at ordinary atmospheric temperatures and at higher temperatures. The tensiles, determined at 100° C. are excellent.

The metal salts of the dithiocarbamic acids of our invention may be represented by the formula

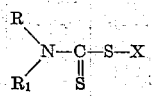

wherein X represents a metal, R represents hydrogen or an organic radical and $R_1$ represents an organic radical. While either or both of R and $R_1$ may represent aromatic radicals, preferably, at least one of R and $R_1$ represents an aliphatic and, particularly, an alkyl radical. We particularly prefer that R and $R_1$ each represents an aliphatic and, specifically, an alkyl radical. In some cases, it will be preferred that R and $R_1$ together represent a carbon chain having the terminal carbon atoms of the chain directly bonded to the nitrogen to form a heterocyclic ring such as pentamethylene and hexamethylene. The metals, forming the salts to be employed in accordance with our invention, may be widely varied but will preferably be those below calcium in the electromotive series and particularly the divalent metals.

By the term "alkyl," as employed hereinafter and in the claims, we mean an aliphatic radical which consists of carbon and hydrogen and which contains no aromatic rings. By the term "aliphatic," we mean that the radical may contain aromatic, as well as non-hydrocarbon substituents. By an "accelerator" and an "accelerating" salt, we mean that the designated compound is one which is operable alone to accelerate the vulcanization of rubber, i. e., in the absence of another organic accelerator. By the term "aryl," we mean that the radical consists of carbon and hydrogen and that the free valence belongs to a carbon in a benzene ring. By the term "aromatic," we mean that the free valence belongs to a carbon in a benzene ring and that the radical may contain non-hydrocarbon substituents.

In order to illustrate the remarkable properties that can be obtained from rubber, treated according to our invention, results of tests, in which combinations of metal salts of dithio-carbamic acids with 2-mercapto-thiazolines have been used, are here described. The following stocks were compounded and used for these tests:

|  | Stock | | | | | | |
|---|---|---|---|---|---|---|---|
|  | A | B | C | D | E | F | G |
| Smoked sheets | 100 | 100 | 100 | 100 | 100 | 100 | 100 |
| Channel black | 25 | 25 | 25 |  |  |  |  |
| Zinc oxide | 5 | 5 | 5 | 5 | 5 | 5 | 5 |
| Stearic acid | 3 | 3 | 3 | 3 | 3 | 3 | 3 |
| Sulfur | 3 | 3 | 3 | 3 | 3 | 3 | 3 |
| 2-mercapto-thiazoline | 0.5 | 0.5 | 0.5 | 0.5 | 0.5 | 0.5 | 0.5 |
| Zinc hexamethylene dithiocarbamate |  | 0.05 | 0.1 |  | 0.025 | 0.05 | 0.1 |

In these stocks, varying proportions of zinc hexamethylene dithiocarbamate are used both in the presence and in the absence of carbon black. The results of the tests are given in Table I.

It can be seen from these results, that, even when as much as 0.1 part of activator is used with 0.5 part of primary accelerator, there is no reversion in the modulus in either the black or the gum stocks. Neither do the stocks lose their ability to be processed with safety. This type of fast, high modulus cure is very desirable.

In order to show that a very flat curing curve may be obtained at even higher curing temperatures and over long periods of time without reversion, the following stock was prepared.

Stock H:
| | |
|---|---|
| Smoked sheets | 100 |
| Zinc oxide | 5 |
| Stearic acid | 2 |
| Sulfur | 3 |
| Phenyl-beta-naphthylamine | 0.75 |
| 2-mercapto-thiazoline | 1 |
| Zinc hexamethylene dithiocarbamate | 0.025 |

This stock was cured at 287° F. and the following modulus and tensile figures obtained.

TABLE II

| Min. cured | 600% modulus | Tensile |
|---|---|---|
| 30 | 1,475 | 3,775 |
| 60 | 1,475 | 3,825 |
| 90 | 1,475 | 3,700 |
| 120 | 1,400 | 3,500 |

A flat curing curve, such as this, is valuable since it assures greater uniformity of cure and of resulting physical properties throughout the rubber article.

In order to illustrate the use of a few of the many metal salts of dithio-carbamic acids which

TABLE I

| Min. cured | Temp. cured | Stock A | Stock B | Stock C | Stock D | Stock E | Stock F | Stock G |
|---|---|---|---|---|---|---|---|---|
| MODULUS AT 600% ELONGATION, LBS./SQ. IN. | | | | | | | | |
| | °F. | | | | | | | |
| 20 | 227 | No cure | No cure | 75 | No cure | No cure | No cure | 175 |
| 30 | 227 | 225 | No cure | 450 | 25 | 150 | 125 | 675 |
| 20 | 274 | 1,875 | 2,375 | 3,075 | 675 | 1,125 | 1,625 | 2,625 |
| 30 | 274 | 2,550 | 3,125 | 3,725 | 925 | 1,575 | 2,175 | 2,675 |
| 45 | 274 | 3,075 | 3,850 | 4,275 | 1,275 | 1,925 | 2,375 | 2,950 |
| 60 | 274 | 3,350 | 4,100 |  | 1,450 | 2,175 | 2,500 | 3,075 |
| TENSILE AT BREAK, LBS./SQ. IN. | | | | | | | | |
| 20 | 227 | No cure | No cure | 350 | No cure | No cure | No cure | 500 |
| 30 | 227 | 475 | No cure | 725 | 475 | 725 | 1,375 | 1,625 |
| 20 | 274 | 2,925 | 3,425 | 4,800 | 2,625 | 3,325 | 3,975 | 4,325 |
| 30 | 274 | 3,625 | 4,475 | 5,025 | 3,250 | 4,050 | 3,850 | 4,200 |
| 45 | 274 | 4,425 | 4,325 | 4,675 | 3,725 | 4,150 | 4,075 | 3,975 |
| 60 | 274 | 4,850 | 4,575 | 4,275 | 3,850 | 3,900 | 3,425 | 3,900 | give excellent results, when used according to our invention, the following stocks were prepared and tested.

|  | Stock | | | | | | | | | |
|---|---|---|---|---|---|---|---|---|---|---|
|  | I | J | K | L | M | N | O | P | Q | R |
| Smoked sheets | 100 | 100 | 100 | 100 | 100 | 100 | 100 | 100 | 100 | 100 |
| Zinc oxide | 5 | 5 | 5 | 5 | 5 | 5 | 5 | 5 | 5 | 5 |
| Stearic acid | 3 | 3 | 3 | 3 | 3 | 3 | 3 | 3 | 3 | 3 |
| Sulfur | 3 | 3 | 3 | 3 | 3 | 3 | 3 | 3 | 3 | 3 |
| 2-mercapto-thiazoline | 0.5 | 0.5 | 0.5 | 0.5 | 0.5 | 0.5 | 0.5 | 0.5 | 0.5 | 0.5 |
| Cadmium dibutyl dithiocarbamate | 0.1 | | | | | | | | | |
| Mercuric dimethyl dithiocarbamate | | 0.1 | | | | | | | | |
| Lead dibutyl dithiocarbamate | | | 0.1 | | | | | | | |
| Cadmium hexamethylene dithiocarbamate | | | | 0.1 | | | | | | |
| Stannous pentamethylene dithiocarbamate | | | | | 0.1 | | | | | |
| Ferrous diethyl dithiocarbamate | | | | | | 0.1 | | | | |
| Chromic pentamethylene dithiocarbamate | | | | | | | 0.1 | | | |
| Zinc dicyclohexyl dithiocarbamate | | | | | | | | 0.1 | | |
| Zinc phenyl ethyl dithiocarbamate | | | | | | | | | 0.1 | |
| Zinc dibenzyl dithiocarbamate | | | | | | | | | | 0.1 |

TABLE III

| Min. cured | Temp. cured | Stock D | Stock I | Stock J | Stock K | Stock L | Stock M | Stock N | Stock O | Stock P | Stock Q | Stock R |
|---|---|---|---|---|---|---|---|---|---|---|---|---|
| MODULUS AT 600% ELONGATION, LBS./SQ. IN. | | | | | | | | | | | | |
|  | °F. | | | | | | | | | | | |
| 20 | 274 | 675 | 1,550 | 1,700 | 1,500 | 1,975 | 1,350 | 2,250 | 1,675 | 1,275 | 1,325 | 2,225 |
| 30 | 274 | 925 | 2,000 | 2,025 | 2,100 | 2,375 | 1,675 | 2,550 | 2,050 | 1,675 | 1,675 | 2,400 |
| 45 | 274 | 1,275 | 2,225 | 2,150 | 2,275 | 2,575 | 1,850 | 2,500 | 2,275 | 2,150 | 2,075 | 2,750 |
| 60 | 274 | 1,450 | 2,200 | 2,200 | 2,425 | 2,575 | 2,025 | 2,300 | 2,275 | 2,250 | 2,050 | 2,725 |
| TENSILE AT BREAK, LBS./SQ. IN. | | | | | | | | | | | | |
| 20 | 274 | 2,625 | 3,225 | 4,025 | 3,775 | 4,100 | 3,750 | 3,925 | 4,550 | 4,525 | 3,650 | 3,975 |
| 30 | 274 | 3,250 | 3,450 | 4,050 | 3,825 | 3,925 | 4,075 | 3,950 | 4,075 | 3,825 | 4,050 | 4,350 |
| 45 | 274 | 3,725 | 3,450 | 4,000 | 4,025 | 3,675 | 4,225 | 3,900 | 3,500 | 4,700 | 4,050 | 3,125 |
| 60 | 274 | 3,850 | 3,500 | 3,675 | 3,575 | 3,400 | 4,250 | 3,350 | 3,900 | 3,950 | 3,900 | 3,000 |

No trouble was experienced in processing any of these stocks.

Not only do the vulcanizates, prepared according to our invention, possess excellent modulus and tensile properties, freedom from reversion and processing safety, but they are also characterized by many other valuable properties which make them desirable commercial vulcanizates.

One property of vulcanized rubber, which is very important for many applications such as the construction of inner tubes for tires, is its resistance to tear. Vulcanizates, prepared according to our invention, have very excellent tear resistance, as shown in Table IV. This excellent tear resistance cannot be obtained by combinations of metal salts of dithio-carbamic acids with mercapto-thiazoles, since an overcured condition generally results which causes a deterioration of the physical properties. These tests were carried out on stocks D and E.

TABLE IV

Tear test at 28° C.

| Min. cured at 274° F. | Stock D | Stock E |
|---|---|---|
| 20 | 17 | 24 |
| 30 | 21 | 27 |
| 45 | 24 | 26 |
| 60 | 25 | 25 |
| 90 | 24½ | 24 |

These tests show that, although the modulus is greatly increased by the addition of the secondary accelerator, the stocks are not overcured since the tear test is equal to or superior to that given by the primary accelerator alone.

The ability of rubber to stand up under high temperatures, while in service, is becoming increasingly more important. The rubber industry is, therefore, desirous of obtaining a rubber vulcanizate, having high modulus and tensile figures, which will also be resistant to conditions of high temperature without deterioration. The combinations of accelerators of this invention will provide these desired characteristics. This is illustrated by the test results given in Table V, in which the results of tensile strength determinations, made at 100° C. on stock E, are presented.

TABLE V

Tensiles at break lbs./sq. in.

| Min. cured at 274° F. | Tensile at 28° C. | Tensile at 100° C. |
|---|---|---|
| 20 | 3,325 | 3,350 |
| 30 | 4,050 | 3,875 |
| 45 | 4,150 | 3,925 |
| 60 | 3,900 | 3,225 |

Rubber, vulcanized by using metal salts of dithio-carbamic acids as accelerators, is notoriously poor in age and heat resistance. This poor resistance toward deterioration carries over into stocks in which these dithiocarbamates are used as activators for mercapto-thiazoles and other similar types of accelerators. These combinations of accelerators are, therefore, valueless for the preparation of most commercial stocks.

It has been found, however, that, when these dithio-carbamates are used as activators for 2-mercapto-thiazolines in accordance with our invention, this deterioration in age and heat resistance is not present. The resulting vulcanizates withstand deterioration to a remarkable degree, as is illustrated by the results given in Table VI. The tests, recorded in this table, were carried out on the following stocks.

| Stock | S | T | U |
|---|---|---|---|
| Smoked sheets | 100 | 100 | 100 |
| Zinc oxide | 5 | 5 | 5 |
| Stearic acid | 2 | 2 | 2 |
| Sulfur | 3 | 3 | 3 |
| Phenyl-beta-naphthylamine | 1 | 1 | 1 |
| 2-mercapto-thiazoline | | 0.75 | |
| 2-mercapto-benzothiazole | | | 0.85 |
| Zinc hexamethylene dithiocarbamate | 0.2 | 0.02 | |

These stocks were cured for 60 minutes at 259° F. and then aged by suspending in an air oven at 100° C. for two days, and also by suspending them in an oxygen bomb at 300 lbs. oxygen pressure at 70° C. for 14 days.

TABLE VI

| Stock | Original | | After 2 days in 100° C. oven, tensile | Tensile after 14 days in 70° C. oxygen bomb |
|---|---|---|---|---|
| | 500% modulus | Tensile | | |
| S | 650 | 3,225 | 175 | 450 |
| T | 950 | 3,925 | 1,775 | 2,800 |
| U | 900 | 4,050 | 275 | 2,725 |

Tests on stock S show the typical poor aging, obtained by the use of metal salts of dithio-carbamic acids alone. In stock U, 2-mercapto-benzo-thiazole was used as representing one of the best aging accelerators known. Dinsmore and Vogt, I. R. I. Transactions, vol. 4, page 93, show clearly that 2-mercapto-benzo-thiazole and p-nitroso-dimethyl aniline are the only two, of a large number of commercial accelerators tested, which also act as antioxidants. Furthermore, Barron, in the book "Modern Rubber Chemistry," Hutchinson, 1937, on page 194, states that 2-mercapto-benzo-thiazole "has a profound retarding effect on aging." Also, Cadwell and Temple, on page 300 of their chapter on accelerators in the book "Chemistry and Technology of Rubber," by Davis and Blake, state: "Mercapto-benzo-thiazole itself is also an excellent antioxidant so that compounds in which it is used age unusually well." On the basis of these statements which have long been borne out by observations in the rubber industry, it is indeed surprising that stock T, which contains a combination of a metal salt of a dithio-carbamic acid with a 2-mercapto-thiazoline, shows very great superiority in resistance to aging in the 100° C. oven to stock U, in which 2-mercapto-benzo-thiazole alone is used as the accelerator, and is also somewhat superior in resistance to aging in the oxygen bomb to the mercapto-benzo-thiazole stock. This result is all the more unexpected since the addition of a dithio-carbamate to a mercapto-thiazole or other similar acidic accelerator, usually greatly lowers the age resistance of the stock. It therefore appears that rubber vulcanizates, prepared according to our invention, are extremely valuable to the rubber industry since they resist deterioration better than the accelerator formerly adopted as the standard.

Besides the above described valuable properties of vulcanizates prepared by the accelerator combinations of our invention, these vulcanizates also possess very good resistance to abrasion, flex-cracking and heat build-up.

Although certain definite combinations of accelerators have been shown, these combinations are illustrative rather than limiting. A great many 2-mercapto-thiazolines may be used as the primary accelerator with excellent results. These include carbon substituted 2-mercapto-thiazolines, in which one or both of the hydrogen atoms in the 4 or 5 or both 4 and 5 positions of the ring are substituted by alkyl groups or hydroxy alkyl groups, as illustrated by the formula:

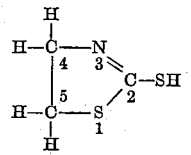

Examples of these are:

4-ethyl-2-mercapto-thiazoline
4-propyl-2-mercapto-thiazoline
4,4-dimethyl-2-mercapto-thiazoline
5,5-dimethyl-2-mercapto-thiazoline
4-methyl-4-ethyl-2-mercapto-thiazoline
4-methyl-5-propyl-2-mercapto-thiazoline
4,4-dimethyl-5-propyl-2-mercapto-thiazoline
4-isopropyl-5-propyl-2-mercapto-thiazoline
4-ethyl-5-propyl-2-mercapto-thiazoline
4-methyl-5-hydroxymethyl-2-mercapto-thiazoline
4-methyl-4-ethyl-5-propyl-2-mercapto-thiazoline
4-ethyl-5-methyl-2-mercapto-thiazoline
4-propyl-5-propyl-2-mercapto-thiazoline
4,5-dimethyl-2-mercapto-thiazoline
4-hydroxyethyl-2-mercapto-thiazoline
4,4,5,5-tetramethyl-2-mercapto-thiazoline Also, various metal salts of 2-mercapto-thiazolines may be used very effectively. These include, among others:

Lead salt of 2-mercapto-thiazoline
Cadmium salt of 2-mercapto-thiazoline
Iron salt of 2-mercapto-thiazoline
Zinc salt of 4-methyl-2-mercapto-thiazoline
Cadmium salt of 4-methyl-2-mercapto-thiazoline
Zinc salt of 4-ethyl-2-mercapto-thiazoline
Lead salt of 4-propyl-2-mercapto-thiazoline
Cadmium salt of 4,4-dimethyl-2-mercapto-thiazoline
Iron salt of 5,5-dimethyl-2-mercapto-thiazoline
Zinc salt of 4-methyl-4-ethyl-2-mercapto-thiazoline
Cadmium salt of 4,4-dimethyl-5-propyl-2-mercapto-thiazoline
Zinc salt of 4-hydroxyethyl-2-mercapto-thiazoline
Zinc salt of 4,4,5,5-tetramethyl-2-mercapto-thiazoline A large number of the metal salts of dithio-carbamic acids are also found to be effective secondary accelerators for 2-mercapto-thiazolines. Examples are the following:

Zinc dimethyl-dithiocarbamate
Cadmium dimethyl dithiocarbamate
Lead dimethyl dithiocarbamate
Ferrous dimethyl dithiocarbamate
Ferric dimethyl dithiocarbamate
Mercuric dimethyl dithiocarbamate
Aluminum dimethyl dithiocarbamate
Stannous dimethyl dithiocarbamate
Cobaltous dimethyl dithiocarbamate
Nickelous dimethyl dithiocarbamate
Silver dimethyl dithiocarbamate
Zinc pentamethylene dithiocarbamate Cadmium pentamethylene dithiocarbamate
Lead pentamethylene dithiocarbamate
Ferrous pentamethylene dithiocarbamate
Ferric pentamethylene dithiocarbamate
Aluminum pentamethylene dithiocarbamate
Chromium pentamethylene dithiocarbamate
Stannous pentametylene dithiocarbamate
Cobaltous pentamethylene dithiocarbamate
Nickelous pentamethylene dithiocarbamate
Silver pentamethylene dithiocarbamate
Cadmium hexamethylene dithiocarbarmate
Lead hexamethylene dithiocarbamate
Ferrous hexamethylene dithiocarbamate
Mercuric hexamethylene dithiocarbamate
Zinc diethyl dithiocarbamate
Cadmium diethyl dithiocarbamate
Lead diethyl dithiocarbamate
Ferrous diethyl dithiocarbamate
Zinc dibutyl dithiocarbamate
Cadmium dibutyl dithiocarbamate
Lead dibutyl dithiocarbamate
Ferrous dibutyl dithiocarbamate
Ferric dibutyl dithiocarbamate
Zinc dipropyl dithiocarbamate
Cadmium dipropyl dithiocarbamate
Lead dipropyl dithiocarbamate
Zinc cyclohexyl dithiocarbamate
Cadmium cyclohexyl dithiocarbamate
Lead cyclohexyl dithiocarbamate
Zinc dicyclohexyl dithiocarbamate
Cadmium dicyclohexyl dithiocarbamate
Lead dicyclohexyl dithiocarbamate
Zinc phenyl ethyl dithiocarbamate
Cadmium phenyl ethyl dithiocarbamate
Lead phenyl ethyl dithiocarbamate
Ferrous phenyl ethyl dithiocarbamate
Zinc dibenzyl dithiocarbamate
Cadmium dibenzyl dithiocarbamate
Lead dibenzyl dithiocarbamate
Zinc furfuryl dithiocarbamate
Cadmium furfuryl dithiocarbamate
Lead furfuryl dithiocarbamate
Cobaltous furfuryl dithiocarbamate
Zinc alpha-methyl pentamethylene dithiocarbamate
Cadmium alpha-methyl pentamethylene dithiocarbamate
Lead alpha-methyl pentamethylene dithiocarbamate
Ferrous alpha-methyl pentamethylene dithiocarbamate
Zinc diallyl dithiocarbamate
Cadmium diallyl dithiocarbamate
Zinc 4-amino quinolyl dithiocarbamate
Cadmium 4-amino quinolyl dithiocarbamate
Zinc o-methyl cyclohexyl dithiocarbamate
Zinc o-hydroxy cyclohexyl dithiocarbamate
Zinc o-chloro cyclohexyl dithiocarbamate
Zinc ethyl cyclohexyl dithiocarbamate
Zinc tetrahydro furfuryl dithiocarbamate
Zinc salt of the dithiocarbamic acid from tetrahydroquinoline The combination of accelerators, employed in accordance with our invention, will generally comprise about 1 to 100 parts of the primary accelerator for each part of the secondary accelerator. Compounding ingredients and fillers, other than those shown in the test formulae and in other proportions, may also be used.

The combinations of accelerators herein described, namely combinations of metal salts of dithiocarbamic acids with 2-mercapto-thiazolines are capable of producing highly desirable types of vulcanized rubber. These combinations produce stocks having very high moduli and tensiles, a fast flat cure at ordinary curing temperatures, and freedom from reversion. These qualities are not obtained at the expense of processing safety as the stocks have little tendency to prevulcanize or "scorch."

The vulcanized rubber, prepared according to our invention, has also exceedingly good resistance toward tear, abrasion, flex-cracking and heat build-up. Another characteristic of great value is the great resistance, shown by these vulcanizates, against deterioration by heat or oxidation. On the whole, the combination of desirable properties, produced by the mixtures of accelerators of our invention, is one that is very difficult to duplicate with any other known accelerator or combination of accelerators.

We claim:

1. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating metal salt of a dithiocarbamic acid, as a secondary accelerator, there being from about 1 to about 100 parts of the primary accelerator to each part of the secondary accelerator.

2. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating metal salt of a dithiocarbamic acid derived from a secondary amine, as a secondary accelerator, there being from about 1 to about 100 parts of the primary accelerator to each part of the secondary accelerator.

3. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating metal salt of a dithiocarbamic acid derived from a secondary amine in which at least one radical attached to the nitrogen is an aliphatic radical, as a secondary accelerator, there being from about 1 to about 100 parts of the primary accelerator to each part of the secondary accelerator.

4. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating metal salt of a dithiocarbamic acid derived from a secondary aliphatic amine, as a secondary accelerator, there being from about 1 to about 100 parts of the primary accelerator to each part of the secondary accelerator.

5. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating metal salt of a dialkyl dithiocarbamic acid, as a secondary accelerator, there being from about 1 to about 100 parts of the primary accelerator to each part of the secondary accelerator.

6. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating metal salt of diethyl dithiocarbamic acid, as a secondary accelerator, there being from about 1 to about 100 parts of the primary accelerator to each part of the secondary accelerator.

7. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating zinc salt of a dithiocarbamic acid, as a secondary accelerator, there being from about 1 to about 100 parts of the primary accelerator to each part of the secondary accelerator.

8. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating zinc salt of a dithiocarbamic acid derived from a secondary amine in which at least one radical attached to the nitrogen is an alkyl radical, as a secondary accelerator, there being from about 1 to about 100 parts of the primary accelerator to each part of the secondary accelerator.

9. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating zinc dialkyl dithiocarbamate, as a secondary accelerator, there being from about 1 to about 100 parts of the primary accelerator to each part of the secondary accelerator.

10. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and zinc diethyl dithiocarbamate, as a secondary accelerator, there being from about 1 to about 100 parts of the primary accelerator to each part of the secondary accelerator.

11. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating metal salt of a dithiocarbamic acid derived from a secondary amine in which two valences of the nitrogen are satisfied by the terminal carbon atoms of a single carbon chain, as a secondary accelerator, there being from about 1 to about 100 parts of the primary accelerator to each part of the secondary accelerator.

12. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating metal salt of a dithiocarbamic acid derived from a secondary amine in which two valences of the nitrogen are satisfied by the terminal carbon atoms of a single saturated hydrocarbon chain of 5 to 6 carbon atoms, as a secondary accelerator, there being from about 1 to about 100 parts of the primary accelerator to each part of the secondary accelerator.

13. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating metal salt of hexamethylene dithiocarbamic acid, as a secondary accelerator, there being from about 1 to about 100 parts of the primary accelerator to each part of the secondary accelerator.

14. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating zinc salt of a dithiocarbamic acid derived from a secondary amine in which two valences of the nitrogen are satisfied by the terminal carbon atoms of a single carbon chain, as a secondary accelerator, there being from about 1 to about 100 parts of the primary accelerator to each part of the secondary accelerator.

15. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating zinc salt of a dithiocarbamic acid derived from a secondary amine in which two valences of the nitrogen are satisfied by the terminal carbon atoms of a single saturated hydrocarbon chain of 5 to 6 carbon atoms, as a secondary accelerator, there being from about 1 to about 100 parts of the primary accelerator to each part of the secondary accelerator.

16. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and zinc hexamethylene dithiocarbamate, as a secondary accelerator, there being from about 1 to about 100 parts of the primary accelerator to each part of the secondary accelerator.

17. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and zinc dibutyl dithiocarbamate, as a secondary accelerator, there being from about 1 to about 100 parts of the primary accelerator to each part of the secondary accelerator.

18. Rubber having incorporated therein, prior to vulcanization, 2-mercapto-thiazoline, as a primary accelerator, and an accelerating metal salt of a dithiocarbamic acid, as a secondary accelerator, there being from about 1 to about 100 parts of the primary accelerator to each part of the secondary accelerator.

19. Rubber having incorporated therein, prior to vulcanization, 2-mercapto-thiazoline, as a primary accelerator, and an accelerating metal salt of a dithiocarbamic acid derived from a secondary aliphatic amine, as a secondary accelerator, there being from about 1 to about 100 parts of the primary accelerator to each part of the secondary accelerator.

20. Rubber having incorporated therein, prior to vulcanization, 2-mercapto-thiazoline, as a primary accelerator, and an accelerating metal salt of a dithiocarbamic acid derived from a secondary amine in which two valences of the nitrogen are satisfied by the terminal carbon atoms of a single saturated hydrocarbon chain of 5 to 6 carbon atoms, as a secondary accelerator, there being from about 1 to about 100 parts of the primary accelerator to each part of the secondary accelerator.

21. Rubber having incorporated therein, prior to vulcanization, 2-mercapto-thiazoline, as a primary accelerator, and an accelerating metal salt of diethyl dithiocarbamic acid, as a secondary accelerator, there being from about 1 to about 100 parts of the primary accelerator to each part of the secondary accelerator.

22. Rubber having incorporated therein, prior to vulcanization, 2-mercapto-thiazoline, as a primary accelerator, and an accelerating zinc dialkyl dithiocarbamate, as a secondary accelerator, there being from about 1 to about 100 parts of the primary accelerator.

23. Rubber having incorporated therein, prior to vulcanization, 2-mercapto-thiazoline, as a primary accelerator, and zinc diethyl dithiocarbamate, as a secondary accelerator, there being from about 1 to about 100 parts of the primary accelerator to each part of the secondary accelerator.

ARTHUR M. NEAL.
BERNARD M. STURGIS.